United States Patent [19]

Williamson

[11] Patent Number: 5,715,681
[45] Date of Patent: Feb. 10, 1998

[54] HYDRAULIC MASTER CYLINDER

[75] Inventor: Michael Williamson, Gwent, United Kingdom

[73] Assignee: Lucas Industries, PLC, United Kingdom

[21] Appl. No.: 640,866

[22] PCT Filed: Nov. 7, 1994

[86] PCT No.: PCT/GB94/02435

§ 371 Date: May 8, 1996

§ 102(e) Date: May 8, 1996

[87] PCT Pub. No.: WO95/13206

PCT Pub. Date: May 18, 1995

[30] Foreign Application Priority Data

Nov. 10, 1993 [GB] United Kingdom ............... 9323188

[51] Int. Cl.$^6$ .................................................. F15B 7/08
[52] U.S. Cl. .......................... 60/585; 60/588; 92/182
[58] Field of Search ................ 60/555, 588; 92/182, 92/194

[56] References Cited

U.S. PATENT DOCUMENTS

| | | | |
|---|---|---|---|
| 2,561,009 | 7/1951 | Byers et al. | 60/588 |
| 3,141,303 | 7/1964 | Baldwin | 60/588 |
| 3,656,414 | 4/1972 | Muller | 92/182 |
| 4,866,938 | 9/1989 | Keegan et al. | 60/588 |

FOREIGN PATENT DOCUMENTS 986901  3/1965  United Kingdom.

*Primary Examiner*—F. Daniel Lopez
*Attorney, Agent, or Firm*—Andrus, Sceales, Starke & Sawall

[57] ABSTRACT

A hydraulic master cylinder having a cylinder body (1) with a piston (3) slidable therein. The piston carries a sealing assembly (20) to permit pressurization of a pressure chamber (6) and fluid recuperation upon retraction of the piston. The sealing assembly includes a first seal (23) of relatively hard material slidable against the internal cylinder wall and a relatively resilient second seal (25) arranged to act between the sealing surfaces of the piston and the first seal to provide a fluid tight pressure seal during pressurization of the chamber.

7 Claims, 2 Drawing Sheets

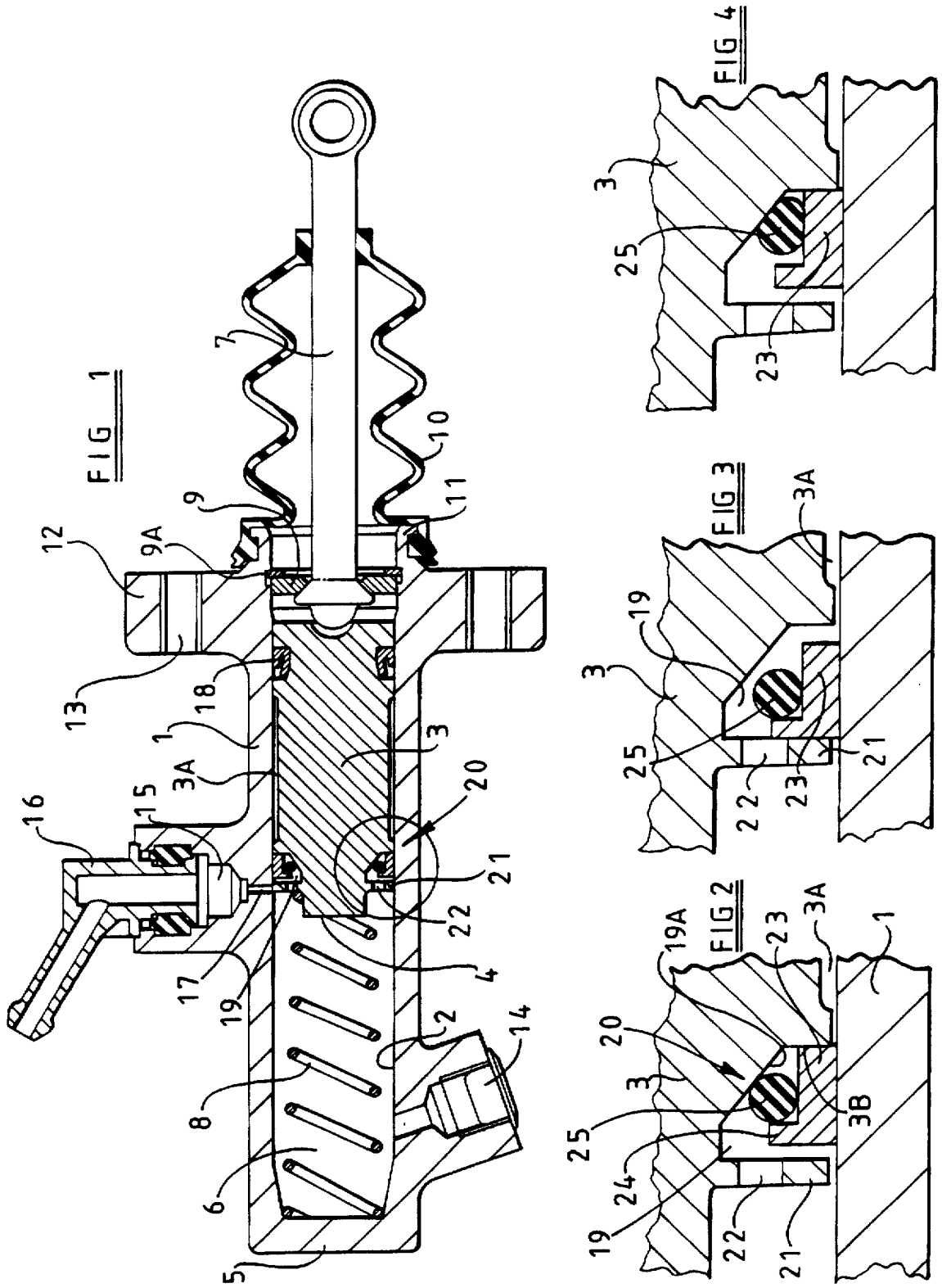

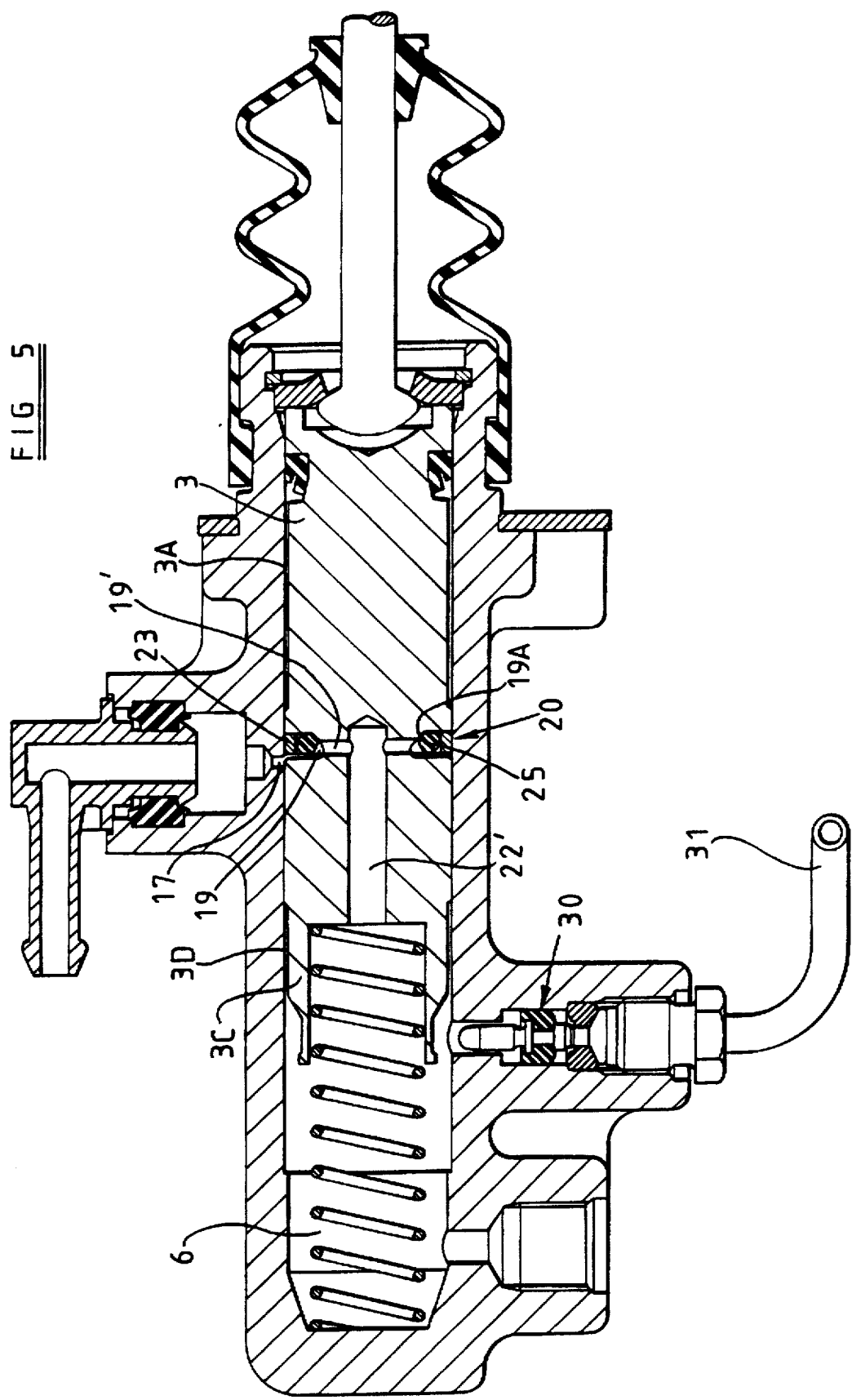

HYDRAULIC MASTER CYLINDER

This invention relates to an hydraulic master cylinder, primarily for a vehicle brake or clutch actuating system, being of the general kind comprising a relatively movable cylinder body and piston, and sealing means between relatively slidable surfaces thereof operable to permit pressurisation of hydraulic fluid in a pressure chamber during relative movement of the body and piston in one direction for actuation of the system, and recuperation of fluid into the chamber via a recuperation port during reverse relative movement of the body and piston. The majority of master cylinders for use in vehicles have a piston movable within a fixed cylinder by action on a driver-operated pedal.

Conventional master cylinders are usually provided with flexible pressure seals, of rubber or similar material for example, which are satisfactory under most conditions of use. However, in the case of heavy duty cylinders in which very high actuating pressures arise, such as those used on off-highway vehicles for example, it has been found that excessively rapid wear of the pressure seal can occur, particularly when the cylinder incorporates a radial recuperation port which is traversed by the seal during the reciprocal movement of the piston.

An object of the present invention is to provide an hydraulic master cylinder of the aforesaid general kind in which the aforesaid problem is alleviated or avoided.

According to the invention, an hydraulic master cylinder of the aforesaid general kind is provided with sealing means in the form of a pressure seal assembly having a first seal part of relatively hard material slidable against one of the cooperating surfaces, and a relatively resilient second seal part arranged to act between one of the cooperating surfaces and the first seal part in order to provide a fluid-tight pressure seal during pressurisation of fluid in the chamber.

Preferably, the second seal part lies generally radially within the first seal part and the surface co-acting with the second seal part is conveniently shaped so as to cause resilient deformation of the second seal part during relative movement of the cylinder body and piston in said one direction, whereby the second seal seals against said co-acting surface and causes radial deformation of the first seal part against its adjacent cooperating surface to enhance sealing thereof.

The pressure chamber may conveniently be provided with a generally radial recuperation port which is traversed by the seal assembly during working relative movement of the body and piston, radial and/or axial recuperation passages in the piston permitting fluid flow around the seal assembly between the pressure chamber and the recuperation port during reverse relative movement of the body and piston following a pressure stroke.

The invention will now be described, by way of example, with reference to the accompanying drawings, in which:

FIG. 1 is a longitudinal cross-section of one form of the hydraulic master cylinder of the invention;

FIGS. 2-4 are similar enlarged sectional views of the encircled part of FIG. 1, illustrating the master cylinder in different operational conditions, and FIG. 5 is a view similar to FIG. 1 illustrating an alternative embodiment of the master cylinder of the invention.

The master cylinder of FIG. 1 has a cylinder body 1 with a longitudinal bore 2 within which slides a pressure piston 3, the forward end 4 of which defines, with the bore and an end wall 5 of the cylinder, a pressure chamber 6. Actuating force is applied to the piston by way of a force input rod 7 connected, in use, to a driver's foot pedal for example (not shown), the piston being urged towards its illustrated rest position by a return spring 8 which holds the piston and rod against a washer 9 which cooperates with a circlip or the like 9A to serve as a backstop. A convoluted boot 10 surrounding the rod and engaging around a grooved boss 11 of the body 1 seals the open end of the cylinder against the ingress of foreign material. The body 1 is provided with a radially extending mounting flange 12 having holes 13 for the reception of fixing bolts or the like. A pressure outlet port 14 communicates with the pressure chamber 6 and is adapted for connection, by suitable piping, to one or more slave cylinders of a working system. A fluid inlet port 15 is connected to a fluid reservoir, in use, by a connector 16 and may communicate with the pressure cylinder via a recuperation port 17.

The piston carries a lip seal 18 of conventional form adjacent its rear end and is formed, adjacent its forward end with a groove 19 which contains a pressure seal assembly 20. The groove 19 is delimited at its forward end by an integral flange 21 of the piston, the flange having through holes 22 distributed around its periphery. The groove 19 and seal assembly 20 are illustrated in greater detail in FIGS. 2 to 4, of which FIG. 2 shows the seal assembly in its rest position as it appears in FIG. 1. It can be seen that the seal assembly 20 includes a generally annular first seal 23 having a peripheral radial flange 24 at its forward end, although the provision of this flange is optional. The seal 23 is of a relatively hard material, such as PTFE, but has a degree of flexibility enabling it to be expanded slightly outwardly for the purpose explained hereafter. Mounted around the seal 23 is a further seal 25 of generally cylindrical cross-section, this seal being of relatively flexible material, such as rubber or the like, enabling it to be deformed readily under pressure. The groove 19 has, opposed to the flange 21, a wall portion 19A which is tapered in the direction of operative travel of the piston, the seal 25 lying between the flange 24 and this tapered wall portion.

FIG. 2 illustrates the passive condition of the seals 23 and 25, in which no pressure is generated in the master cylinder and the seal 23 rests lightly against a radial surface 3B of the piston 3, with the seal 25 trapped lightly between the tapered piston surface 19A and the flange 24 of the seal 23. When an input force is applied to the piston via the force input rod 7, the piston slides forwardly against the resistance of the return spring 8 and once the seal assembly thereon has moved sufficiently to block the recuperation port 17, pressure begins to build in the chamber 6. The increase in pressure is applied through the holes 22 to the seal assembly, forcing the resilient seal 25 in the reverse direction along the seal 23 and into tight sealing engagement with the tapered face 19A, as can be seen from FIG. 4. The increasing pressure forces the seal 25 into the generally wedged shaped gap between the surface 19A and seal 23, causing the seal 25 to be deformed and apply a resiliently derived force radially outwardly against the seal 23 to flex the latter slightly outwardly against the wall of the bore 2 and enhance the sealing effect thereof. The greater the applied pressure, therefore, the greater the force acting on the seals 23 and 25, ensuring a substantially fluid tight seal between the piston and cylinder body even at the very highest operating pressures.

It will be seen that over a substantial part of the working travel of the piston, a land 3A thereof lies in communication with the recuperation port 17, enabling fluid from the reservoir to surround the piston to the rear of the seal assembly 20. During the retraction stroke of the piston, the seal assembly will remain in the position shown in FIG. 4 until there exists in the chamber 6 a lower pressure than that produced by the head of fluid in the reservoir. When this occurs, the seal assembly will move across the groove 19 into abutment with the flange 21 (FIG. 3), allowing oil to pass from the reservoir via the land 3A around the seal and through the holes 22 into the pressure chamber for pressure equalisation. With the arrangement disclosed in FIGS. 1 to 4, the initial forward movement of the piston prior to the generation of pressure in the chamber 6 will cause any air bubbles which may have accumulated in the upper region of the master cylinder to be expelled to the reservoir.

The alternative embodiment illustrated in FIG. 5 is generally similar to that of the previous embodiment and the same or similar components will be identified by the same reference numerals as previously. The seal assembly 20 is housed nearer to the axial centre of the piston than in the previously described embodiment and the recuperation holes 22 of that embodiment are replaced by a central bore 22' which communicates with the groove 19 by way of a number of radial passages 19'. In this case, the relatively hard seal 23 is in the form of a plain annulus surrounding the resilient sealing ring 25 which lies against a forwardly facing tapered surface 19A of the groove 19. Cylinder operative pressure is applied to the seal assembly via passages 22' and 19' to compress the resilient seal part 25 and expand the seal 23 against the cylinder internal wall.

The other principal difference as compared with the previous embodiment is the elongation of the piston 3 to form a nose 3C which, in the illustrated retracted position of the piston is located adjacent a transfer valve assembly 30, of conventional design, which is connected, in use, by a transfer passage 31 to a similar transfer valve on another cylinder which forms part of a twin master cylinder assembly for use on off-highway vehicles for example. Such a master cylinder assembly enables normal braking to be achieved by operation of both master cylinders simultaneously and steering assistance to be provided by operating one or the other master cylinder individually. The valves 30 cooperate with the extensions 3C on the pistons to ensure that, when one cylinder is operated individually, it is isolated by its transfer valve from the low pressure chamber of the other cylinder, then at low pressure, and that, when the cylinders are operated simultaneously, they are interconnected via the transfer passage to ensure equalisation of pressures within the cylinders and consequent balanced braking. This action will be familiar to those skilled in the art and will not be described further. The piston nose 3C forms a land 3D, but this may be extended as far as the radial passages 19', enabling fluid pressure to be applied to the seal parts 23, 25 through the land as well as or instead of through the centre of the piston.

In operation, pressurisation will begin, as before, when the seal assembly 20 has blocked the recuperation passage 17 and the resilient seal will thereafter be pressed against the inclined surface 19A of the groove 19 to form a fluid tight seal with the piston, whilst simultaneously slightly flexing the ring 23 outwardly against the cylinder bore to produce a fluid-tight seal, as previously. When, upon retraction, the pressure in the pressure chamber 6 falls below that in the fluid reservoir, fluid will be allowed to flow via the land 3A around the seal assembly and along the radial passages 19' and axial passage 22' into the cylinder for pressure equalisation.

The use of the seal assembly with its relatively hard but slightly flexible seal 23 provides a low friction contact with the surface of the cylinder bore which will also resist wear, particularly upon traversing the recuperation port 17, better than a conventional flexible seal. This can be particularly advantageous in the event that heavy prolonged braking gives rise to excessive heating and consequent expansion of the fluid, leading to abnormal pressure on the seal. A conventional seal can then experience high wear and possible damage, particularly when traversing a fluid recuperation port, whereas the relatively hard seal part 23 of the invention provides increased tolerance of such conditions. The use in the assembly of the flexible seal 25, which does not contact the cylinder bore but acts upon the seal 23 causing it to flex outwardly, enables an excellent high pressure fluid seal to be obtained over a wide range of operating conditions.

I claim:

1. An hydraulic master cylinder comprising a relatively movable cylinder body and piston, and sealing means between respective cooperating surfaces thereof operable to permit pressurisation of hydraulic fluid in a pressure chamber during relative movement of the body and piston in one direction for actuation of the system, and recuperation of fluid into the chamber via a recuperation port during reverse relative movement of the body and piston, the sealing means being in the form of a pressure seal assembly having a first seal part of relatively hard material slidable against one of the cooperating surfaces, and a relatively resilient second seal part arranged to act between another of the cooperating surfaces and the first seal part in order to provide a fluid-tight pressure seal during pressurisation of fluid in the chamber, the other surface being shaped so as to cause resilient deformation of the second seal part during relative movement of the cylinder body and piston in said one direction, whereby the second seal part seals against said other surface and causes radial deformation of the first seal part against said one cooperating surface to enhance sealing thereof.

2. A master cylinder according to claim 1, wherein the second seal part lies radially within the first seal part.

3. A master cylinder according to claim 1, wherein the first seal part is a plain annulus and the second seal part is housed closely within the first part, chamber pressure being applied to the seal assembly via at least one radial passage of the piston.

4. A master cylinder according to claim 1, wherein the pressure chamber is provided with a generally radial recuperation port which is traversed by the seal assembly during working relative movement of the body and piston, radial and/or axial recuperation passages in the piston permitting fluid flow around the seal assembly between the pressure chamber and the recuperation port during reverse relative movement of the body and piston following a pressure stroke.

5. A master cylinder according to claim 1, wherein the cylinder body has an elongate bore containing said piston slidable therein, the seal assembly surrounding the piston and cooperating with opposed respective cylindrical surfaces of the bore and piston, the shaped cooperating surface being a surface portion of the piston tapered in the direction of piston working movement.

6. A master cylinder according to claim 5, wherein the piston is provided, forwardly of the seal assembly in said direction, with a generally radially projecting flange having at least one through aperture to permit recuperative fluid flow upon return movement of the piston.

7. A master cylinder according to claim 1, wherein the first seal comprises a cylindrical body serving to surround and support the second seal part, and a generally radially projecting flange serving to retain the second seal part in the direction of piston working movement.

* * * * *